United States Patent [19]

Dirlikov et al.

[11] Patent Number: 5,556,921

[45] Date of Patent: Sep. 17, 1996

[54] AIR DRIED CROSS-LINKABLE POLYMERIC VEHICLES WHICH INCLUDE ACETYLENIC GROUPS

[75] Inventors: Stoil Dirlikov; Zhao Chen, both of Ypsilanti, Mich.

[73] Assignee: Eastern Michigan University, Ypsilanti, Mich.

[21] Appl. No.: 195,545

[22] Filed: Feb. 14, 1994

(Under 37 CFR 1.47)

[51] Int. Cl.$^6$ .................... C08K 3/10; C08J 3/24
[52] U.S. Cl. .............. 525/245; 525/246; 525/275; 525/328.1; 525/279; 526/93; 526/147; 526/172; 526/285
[58] Field of Search ............ 525/245, 246, 525/275, 328.1; 526/93, 147, 172, 285

[56] References Cited

U.S. PATENT DOCUMENTS

| | | | |
|---|---|---|---|
| 3,129,201 | 4/1964 | Miller | 526/284 |
| 3,562,218 | 2/1971 | D'Alelio | 525/153 |
| 3,562,231 | 2/1971 | D'Alelio | 525/328.1 |
| 3,594,175 | 7/1971 | Hay | 430/270 |
| 4,226,800 | 10/1980 | Picklesimer | 558/419 |
| 4,708,991 | 11/1987 | Lau et al. | 525/275 |
| 4,885,403 | 12/1989 | Inbasekaran et al. | 568/631 |
| 5,239,032 | 8/1993 | Yamada et al. | 526/285 |
| 5,290,908 | 3/1994 | D'Alelio | 528/353 |

OTHER PUBLICATIONS

A. S. Hay (1969) J Polym. Sci A-1, vol. 7, 1625–1634.
Wu et al., "Coatings Curable with Low–Emission Radiation," in *Radiation Curing of Polymeric Materials*, ACS Symposium Series 417, Washington, D.C. (1990).
Owen, "Olefinic Acids. Part I. The Reactivity of α–Bromocrotonic Acid." J. Am. Chem. Soc. 385 (1945).
Raphael, *Acetylenic Compounds in Organic Synthesis*, 127, Butterworths Scientific Publications (1955).
Rutledge, *Acetylenes and Allenes*, Reinhold Book Corp., New York, 283 (1969).
Kruse et al., "N,N–Dialkyl–1,1–dimethyl–2–butynylamines by the Reaction of Propyne with Secondary Aliphatic Amines," 83 J. Am. Chem. Soc. 213 (1961).
Kruse et al., "Ethylidenimies by the Reaction of Acetylene with Primary Aliphatic Amines," 83 J. Am. Chem. Soc. 216 (1961).
McMullen et al., "Elimination–Addition. Part VIII. Structures of Acetylene–Amine Adducts," (B) J. Chem. Soc. 1217 (1966).
Hay, "Oxidative Coupling of Acetylenes," 25 J. Org. Chem. 1275 (1960).
Hay, "Oxidative Coupling of Acetylenes II," 27 J. Org. Chem. 3320 (1962).
Hennion et al., "A Proposed Mechanism for Mercury Catalysis in Acetylene Addition Reactions", 1 J. Org. Chem. 159 (1936).
Glaser, 154 Ann. 137 (1870).
Glaser, 2 Ber. 422 (1869).
Hay et al., "Photosensitive Polyacetylenes," 8 Polymer Letters 97 (1970).
Dirlikov, "Propargyl–Terminated Resins—A Hydrophobic Substitute for Epoxy Resins," 2(1) High Performance Polymers 67 (1990).
Eglington et al., "The Coupling of Acetylenic Compounds" in *Advances in Organic Chemistry*, 225–263, Interscience Publishers, N.Y. (1963).
Feng et al., "Mechanism of B–Staging and Curing of Propargyl Terminated Resins," 60 Polymer Mat. Sci. Eng. 618 (1989).
Bowden et al., "Researches on Acetylenic Compounds Part VIII. Miscellaneous Addition Reactions of Ethynyl Ketones," J. Am. Chem. Soc. 945 (1946).
Chen et al., "Air–Drying Mechanism of Propargyl Terminated Resins; I. Cobalt Drier," 69 Polym. Mater. Sci. Eng. 388 (1993).
Dirlikov, "A Review on Propargyl Terminated Resins," 62 Proc. Polym. Mat. Sci. Eng. 603 (1990).

*Primary Examiner*—Mark Nagumo
*Attorney, Agent, or Firm*—Fitch, Even, Tabin & Flannery

[57] ABSTRACT

This invention is directed to a fast curing polymer composition which does not require baking or thermosetting to provide a cross-linked coating binder. The composition comprises a polymer which is a homopolymer or copolymer of alpha, beta unsaturated monomers having pendent acetylenic groups which cross-link upon air drying to provide a coating binder.

21 Claims, No Drawings

5,556,921

AIR DRIED CROSS-LINKABLE POLYMERIC VEHICLES WHICH INCLUDE ACETYLENIC GROUPS

This invention relates to polymeric vehicles which include acetylenic groups. More specifically, a polymeric vehicle is provided that comprises a polymer which is a homopolymer or copolymer of alpha, beta unsaturated monomers having pendent acetylenic groups which cross-link upon air drying to provide a coating binder.

BACKGROUND OF THE INVENTION

Coatings based on thermoplastic resins have many good properties, such as exterior durability. Their solvent resistance, however, is very poor due to lack of cross-linking among the polymer molecules. They often also require large amounts of solvent to reduce viscosity to a level where the polymeric vehicle or formulated coating composition can be conveniently applied to a substrate.

Efforts have been made to develop low molecular weight thermosetting resins which have lower viscosities and high solids. These resins provide coating formulations which may be cross-linked to form films with improved solvent resistance. The most common thermosetting acrylic resins contain hydroxyl groups. These resins are cross-linked with melamine-formaldehyde resins or polyisocyanates and usually require a baking temperature of about 150° C.; and hence, consume energy for their application and inconveniently require a heating step for a cure into a coating binder. Furthermore, isocyanates are sensitive to moisture, often inconveniently require prepolymers and are toxic.

Terminal acetylenes which have propargyl groups (—$CH_2C\equiv CH$) are known to undergo an oxidative or Glaser coupling. Glaser, 154 Ann. 137 (1870); Glaser, 2 Ber. 422 (1869). This reaction is generally effected by air or oxygen either in an aqueous solution of a mixture of copper (I) chloride and ammonium chloride or in an organic solution of an amine complex of a copper (I) salt. Raphael, *Acetylene Compounds in Organic Synthesis*, 127, Academic Press, N.Y. (1955); Hay, *Oxidative Coupling of Acetylenes*, 25 J. Org. Chem. 1275 (1960); Hay, *Oxidative Coupling of Acetylenes. II.*, 27 J. Org. Chem. 3320 (1962). The reaction proceeds smoothly at room temperature; and even though it has found a wide variety of applications in organic synthesis of conjugated acetylenes, it has not been used in connection with polymerization reactions or the coatings industry.

Despite the fact that propargyl polymers are not new in connection with polymers [See U.S. Pat. No. 3,562,231 to D'Alelio, the bromination of polymers of propargyl methacrylate to yield hydrolyrically stable materials; U.S. Pat. No. 4,226,800, to Picklesimer, a process for the preparation of phenolic materials containing propargyl groups where a polyhydric phenolic material is reacted with propargyl bromide; Wu et al., "Coatings Curable with Low-Emission Radiation", in *Radiation Curing of Polymeric Materials*, ACS Symposium Series 417, Washington, D.C. (1990), radiation and/or thermal curable materials based on linear polymers of propargyl derivatives of bisphenols], the advantages of acrylic polymers for coatings and polymeric vehicles have not been advantageously combined with the ability of acetylenic groups or propargyl groups to undergo oxidative coupling to provide polymeric vehicles for coating binders.

Indeed, oxidative coupling of acetylenic polymers according to the invention not only is an attractive approach for development of air drying resins for coating applications, it also provides a high solids polymeric vehicle to reduce the emissions of volatile organic compounds (VOCs) from such coating compositions.

An object of this invention is to provide a fast curing polymeric vehicle which will cure into a coating binder which is hard, has good impact resistance and is resistant to acidic and basic conditions.

Another object of this invention is to provide a fast curing air drying polymeric vehicle which will air dry at room temperature.

Further objects and advantages of the invention will be found by reference to the following description.

SUMMARY OF THE INVENTION

According to the invention, the oxidative coupling of polymers with pendent acetylenic groups unexpectedly provides polymeric vehicles which do not require baking or thermosetting to provide cross-linked coating binders. Such coupling of the polymers provides an attractive oxidative cure air drying approach for different high solids coating applications including water reducible polymeric vehicles and polymeric vehicles which include organic solvents.

In one aspect, the invention comprises a polymeric vehicle which after being applied to a substrate at a thickness of about 1 to about 3 mils wet, and which after an oxidative cure by air drying for not more than about 24 hours at not less than about −10° C. provides a coating binder having a glass transition temperature of not less than about 25° C., a pencil hardness of at least about B and an impact resistance of least about 50 inch-pounds. The polymeric vehicle of the invention also permits a high solids low VOC formulated coating composition.

The polymeric vehicle comprises a polymer and may include a catalyst which catalyzes the oxidative coupling of acetylenic groups where the catalyst and acetylenic groups are in amounts effective for providing a coating binder with the pencil hardness and impact resistance as aforesaid. In general, polymer in the polymeric vehicle is adapted to cross-link through a catalytic reaction. To effect the reaction, the polymeric vehicle comprises at least about 0.1 weight percent of a copper (I) catalyst which may be activated by an amino or an amido group. The polymer in the polymeric vehicle has a glass transition temperature (Tg) below about 20° C. and preferably below about −10° C., has a number average molecular weight in the range of from about 500 to about 100,000, and is selected from the group consisting of a homopolymer and copolymer of alpha, beta unsaturated monomers. From about 1 to about 100 percent of the monomeric units which form the polymer have at least one acetylenic group. The polymeric vehicle is cured through the oxidative reaction of the acetylenic groups on the polymer to provide the coating binder.

In another important aspect, the invention provides a polymeric vehicle after being applied to a substrate at a thickness of about 1 to about 3 mils wet and which after an oxidative cure by air drying with at least about 0.1 weight percent of a catalyst for not more than about 60 minutes at not more than about 30° C. provides a coating binder having a Tg of more than about 25° C., a pencil hardness of at least about B and an impact resistance of least about 50 inch-pounds. In this aspect, the polymer includes amine or amide groups in an amount which is effective for increasing the reactivity of the blend of catalyst and polymer by activating the catalyst.

In another aspect, the invention provides a high solids polymeric vehicle without additional organic solvent through the use of a reactive diluent which comprises a compound with two or more acetylenic groups which may oxidatively couple with the acetylenic groups on the polymer, link two or more polymer chains and reduce the viscosity of the polymer/catalyst blend such that it may be more readily applied by existing commercial application equipment.

In another aspect, the invention provides a method for providing a cured cross-linked coating binder by air drying a polymeric vehicle which includes a polymer of at least one alpha beta unsaturated monomer as aforesaid. The polymer has from about 1 to about 100 percent of the monomeric units forming the polymer substituted with at least one acetylenic group which after polymerization of the monomers are pendent to the polymer. The method includes the oxidative coupling and cross-linking of the polymers through the acetylenic groups.

DETAILED DESCRIPTION OF THE INVENTION

Definitions

As used in this application, "polymer" means a polymer with repeating monomeric units. "Homopolymer" means a polymer made with one type of monomer. "Copolymer" means a polymer made with two or more types of monomers.

"Acetylenic group" means —C≡CH. "Propargyl group" is a type of an acetylenic group and means —CH$_2$C≡CH. "Oxidative cure by air drying" means that the polymer is coupled in the presence of oxygen through the reaction of the triple bonds of pendent acetylenic groups on the polymer wherein after the reaction the triple bond still exists. "Polymeric vehicle" means all polymeric, resinous components and may include catalytic ingredients in the formulated coating composition, i.e., before film formation. "Coating binder" means the polymeric part of the film of the coating after solvent has evaporated and after cross-linking. "Formulated coating composition" means the polymeric vehicle and solvents, pigments, and additives which may optionally be added to impart desirable application characteristics to the formulated coating composition and desirable properties such as opacity and color to the film.

"Solvent" means water and/or an organic solvent. "Organic solvent" means a liquid which includes but is not limited to carbon and hydrogen which liquid has a boiling point in the range of from about 35° C. to about 300° C. at about one atmosphere pressure.

"VOC" means volatile organic compounds and "low VOC" means about 1 pound per gallon or about 120 grams of volatile organic compounds per liter of formulated coating composition, not including water. "Volatile organic compounds" are defined by the U.S. Environmental Protection Agency as any organic compound which participates in atmospheric photochemical reactions, except for specific designated compounds which have negligible photochemical activity. Water and CO$_2$ are not VOCs. VOCs have been generally designated to include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromoethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylester-sulphuric acid, dimethylbutanone, pentachloroethane, trichlorotrifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloroethane, trichloroethene, 2,3-dimethylbutane, tetrachloroethane, dimethyl-3-methylene-bicycloheptane, α-pinene, hexachlorobutadiene, methylnaphthalene, naphthalene, quinoline, methylnaphthalene, phenyl-propanone, dimethylbenzene, o-cresol, chloromethylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloromethylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethylpyridine, bromobenzene, methylcyclohexane, toluene, chlorobenzene, phenol, 2-methylpyridine, pentane, 2-pentene, bromochloropropane, 1H-pyrrole, tetrahydrofuran, hexane, 1,4-dichlorobutane, cyclohexane, cyclohexene, pyridine, octaine, 1-octene, nonane, dodecane, propene, 2-methyl-1-pentene, 2-methyl-1-propene, isoquinoline, trichlorobenzene, propanal, butanal, 1,4-dioxane, 1-nonene, decane, dibromochloromethane, 2-chlorobutadiene, tetrachloroethene, dimethyl-methylenebicycloheptane, 1,2-diethylbenzene, (2-methylpropyl)-benzene, acetic acid ethylester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethylpentane, decamethylcyclopentasiloxane, 1,3-dichlorobenzene, hexadecane, 2-methylthiophene, 3,3-dimethylpentane, 3-methyl-2-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicycloheptane, (E)-2-heptene, 4-methylnonane, tetrachlorobenzene, butene, chloronitrobenzene, dichlorobenzene, dichloroethene, tetramethylbenzene, bromopropane, dichloro-1-propene, chlorobenzenamine, dimethylcyclohexane, dichloronitrobenzene, dichloronaphthalene, dimethylcyclopentane, bromoethylbenzene, dichloromethylbenzene, benzenedicarboxaldehyde, benzoyl nitro peroxide, bromochloropropane, dibromochloropropane, pentachlorobutadiene, dibromochloropropane, 2-butoxyethanol, bromopentachloroethane, tetradecamethylcycloheptasiloxane, trimethylpentanediol, dodecamethylcyclohexasiloxane, hexamethylcyclotrisiloxane, octamethylcyclotetrasiloxane, hexadecamethylcyclooctasiloxane, tridecane, tetradecane.

A "high solids formulated coating composition" means a nonaqueous or aqueous formulated coating containing not more than about 250 grams of volatile organic substances per liter of formulated coating composition as measured by ASTM test D2369-87. "Film" is formed by application of the formulated coating composition to a base or substrate, evaporation of solvent, if present, and cross-linking. "Air-dried formulated coating composition" means a formulated coating composition that produces a satisfactory film without heating or baking and requires oxygen for curing to form the coating binder.

"Acrylic polymer" means a polymer or copolymers of the following "acrylic monomers" which monomers may be substituted with one or more acetylenic groups according to the invention.

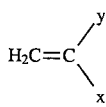

wherein
y=CH$_3$ or H
x=

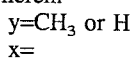

C$_6$H$_5$— or tolyl
R=straight chain or branched alkyls having 1 to 12 carbons,

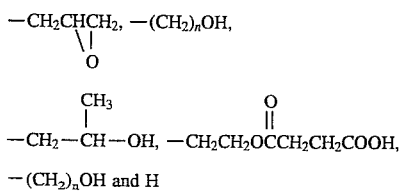

— (CH$_2$)$_n$OH and H
n=2 to 7.

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxyloropyl acrylate; 2-hydroxy-1-methyl-ethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

The Invention

The invention provides a polymeric vehicle which comprises a polymer selected from the group consisting of homopolymer and copolymer of alpha, beta unsaturated monomers with the resulting polymer being substituted with pendent acetylenic groups which are effective for a catalyzed oxidative coupling to form a coating binder. The polymer may be used as the sole component of a polymeric vehicle for a coating binder. Formation of the coating binder requires a catalyst; and in an important aspect, the catalyst requires activation with an amine or an amide. Organic solvents and/or water and known additives such as pigments, may be added to provide a formulated coating composition. The polymers have sufficient pendent acetylenic substitution which is effective for cross-linking through an air dry oxidative cure at not less than −10° C. for 24 hours to provide a coating binder with a hardness of at least about B and an impact resistance of at least about 50 inch-pounds after application to a substrate at a thickness of about 1 to about 3 mils wet. Acetylenic substitution of the polymer is such that from about 1 to about 100 molar percent of the monomeric units which form the polymer are substituted with an acetylenic group and preferably from about 5 to about 20 molar percent of the monomers in a copolymer with pendent acetylchic groups are substituted with acetylenic groups. In an important aspect, the acetylenic group is a propargyl group such as a propargyl ether (—OCH$_2$C≡CH) or propargyl ester —C(=O)—OCH$_2$C≡CH. Prior to cross-linking through the air dry oxidative cure, the polymer has number average molecular weight in the range of from about 500 to about 100,000. Particularly useful polymers which include propargyl groups may be defined by the formula for a polymer which has the repeating units

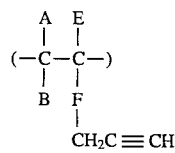

wherein,
A is selected from the group consisting of —H or alkyl having one to four carbon atoms;
B is selected from the group consisting of —H or alkyl having one to four carbon atoms;
E is selected from the group consisting of —H, and 1 to 4 carbon alkyl; and
F is selected from the group consisting of —C(=O)O—, —O—,

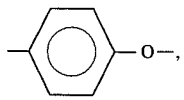

—C(=O)O(CH$_2$CH$_2$O—)$_n$, wherein, n=1–5.

The monomers which provide the polymer are α,β unsaturated monomers which are free radically polymerized through the double bond in the monomer. Of this class of monomers, acrylic monomers having the formula

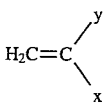

as previously described herein are particularly useful in practicing the invention. Particularly useful monomers with acetylenic groups which may be polymerized to provide a polymer according to the invention include the propargyl methacrylate, propargyl acrylate, propargyl ether of 4-vinylphenol, vinyl propargyl ether, and vinyl propiolate.

Acrylic homopolymers and copolymers that contain pendent acetylenic groups such as propargyl groups may be prepared by solution polymerization of the corresponding monomers in acetone under reflux in the presence of azobisisobutyronitrile (AIBN) or other initiators. In contrast to the homopolymers which have a propargyl group for each monomer unit, copolymers that contain a low content of acetylenic groups such as below 1% do not cross-link by air drying at room temperature to effect an acceptable coating. Copolymer solutions having an effective amount of acetylenic groups for cross-linking into a coating binder may be used directly (without polymer precipitation) for curing in solution or preparation of air-drying coatings on cold rolled steel panels.

Poly (propargyl methacrylate) may be obtained by solution polymerization of propargyl methacrylate in acetone under reflux in the presence of benzoyl peroxide (or AIBN) as an initiator according to the following reaction.

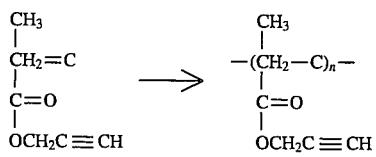

The polymer is soluble in common organic solvents, such as methyl ethyl ketone and dimethylformamide.

According to one aspect of the invention the polymeric vehicle comprises a polymer which is a copolymer of alpha, beta-unsaturated monomers not all of which are substituted with acetylenic groups. Examples of particularly useful monomers, which do not include acetylchic or propargyl groups and which may be copolymerized to provide a polymer which may be catalytically cross-linked to provide a coating binder, include the monomers acrylic acid, methacrylic acid, methyl methacrylate, butylacrylate, acrylonitrile, acrylamide, styrene, 1,3-butadiene, 1-hexene, p-tert. butylstyrene, dimethylchloroprene, chlorostyrene, isobutylene, 2,3-dimethylbutadiene, ethyl acrylate, methacrylonitrile, alpha-methylstyrene, 4-methylpentene-1, alpha-olefins, vinyl isobutyl ether, N,N'-dimethylacrylamide, N,N'-dimethylmethacrylamide, and 4-vinylpyridine. The molar content of the nonacetylenic comonomers is in the range of from about 0 to about 99 percent, and preferably is from about 95 to about 80 percent.

While the acetylenic or propargyl substituted polymers of the invention may be made by polymerizing acetylenic or propargyl substituted monomers, acetylenic or propargyl groups also can be grafted onto the polymeric chain by reacting an acetylenic or propargyl substituted compound with a functional group which is reactive with a functional group pending from the polymer chain to form a polymer with pendent acetylenic or propargyl groups. In this connection, poly (propargyl ether of 4-vinylphenol) was prepared with quantitative yield in a one-step reaction by refluxing poly (4-vinylphenol) in acetone with propargyl bromide in the presence of potassium carbonate for 72 hours according to the following reaction:

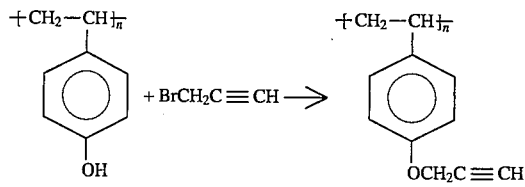

The conversion of hydroxyl groups was above 98% as determined by infrared spectra before and after the reaction. The poly(propargyl ether of 4-vinylphenol) is a non-volatile viscous semi-solid which is soluble in most organic solvents, such as methyl ethyl ketone and dimethylformamide.

Ester propiolate groups may be grafted onto a polymer by reacting poly (vinyl acetate) with propiolic acid (HOOCC≡CH) according to the following reaction.

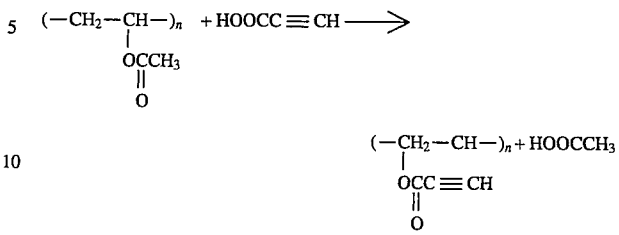

Polyvinyl alcohol also may be grafted in the same manner as shown above. Other functional groups which are reactive with each other and may be appropriately on the polymer or the acetylenic compound which is to be grafted onto the polymer include but are not limited to: amine, chlorine, bromine, iodine, sulfo and hydroxyl group.

The oxidative coupling of acetylenic groups is a catalyzed reaction, and a catalyst is required to provide a coating binder. Hence, a copper I catalyst is included in the polymeric vehicle or formulated coating composition to oxidatively couple the acetylenic groups of different polymer chains in the polymeric vehicle with each other. The catalyst is in an amount effective to cross-link the acetylenic groups to provide the coating binder with a hardness and impact resistance as previously described. Suitable copper (I) catalysts include copper (I) chloride, copper naphthenate (commercially available from Mooney Chemicals, Inc. as NAP-ALL, 8% copper) and copper neodecanoates/octoate (commercially available from Mooney Chemicals, Inc. as CEM-ALL, 12% copper), copper (I) carboxylates of any linear or branched aliphatic acid or cycloaliphatic or aromatic acid with copper (I) chloride being preferred. In a highly preferred embodiment the catalyst is activated with an amine or an amide activator such as N,N,N',N'-tetramethylethylenediamine, pyridine, dimethylformamide, ammonium chloride and mixtures thereof. Use of an added activator may be avoided if the polymer has an amino or amido functionality. Indeed, in an important aspect of the invention, the oxidative cure may be accelerated with a polymer having such amino or amido substitution.

Different advantages for the polymeric vehicle and coating binder may be achieved by controlling the functionality of polymer which is to be cross-linked through the oxidative coupling reaction of the invention. As previously discussed, a basic polymer with amino and/or amido groups will act as accelerators for the catalyzed oxidation cross-linking reaction. In this aspect, the polymer or copolymer should contain at least about 0.1 molar percent of the monomeric units which form the polymer have amino or amido groups. An acidic polymer having carboxyl groups pendent therefrom additional to the pendent acetylenic groups will provide water solubility or dispersity for the polymer. A polymer having at least about 4 to about 5 molar percent of a monomer with pendent carboxyl groups which are additional to the pendent acetylenic groups will provide water dispersability or solubility for the polymer. A nonionic polymer which does not have an acid or basic functionality will provide a polymer which is hydrophobic. A polymer or copolymer having not more than about 1 molar percent of monomeric units which form the polymer with acid (carboxyl groups) or basic groups (amino or amido) will provide a nonionic polymer which will be hydrophobic.

Water dispersible latexes may be made to provide the polymeric vehicle which may be air dried according to the invention. The polymers which have the pendent acetylenic groups may be made in the presence of a surfactant(s) by aqueous polymerization of monomers which polymerization results in particles of the polymer having a particle size of about one micron or less. The resulting particulate polymer with pendent acetylenic groups is dispersed in water as a latex.

The polymer having pendent acetylenic groups may have too high of a viscosity to apply it with existing commercial application equipment. If this is the case, a reactive diluent with two or more acetylenic groups may be used to reduce the viscosity of the polymeric vehicle or formulated coating composition. In this aspect the composition which is the reactive diluent has a viscosity of not more than about 500 cP, preferably not more than about 100cP at from about 20° C. to about 60° C., is miscible with the polymer and has two or more acetylenic groups, preferably two, which react with the pendent acetylenic groups on the polymer to couple the polymers. Acetylenic compounds which are very useful in this aspect of the invention are aliphatic, cycloaliphatic, and aromatic dipropargyl ethers having a molecular weight of not more than about 500. Four of such ethers include

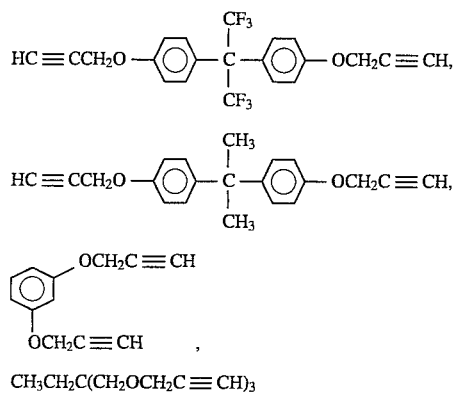

and their mixtures.

The reactive diluent is added to provide a high solids polymeric vehicle and formulated coating composition. The formulated coating composition with the addition of the reactive diluent in lieu of solvent should have a viscosity of not more than about 10000 cP, preferably not more than about 5000 cP, at from about 10° to about 50° C.

The following examples illustrate methods for carrying out the invention and should be understood to be illustrative of, but not limiting upon, the scope of the invention which is defined in the appended claims.

EXAMPLE I

Preparation and Cross-Linking of Poly(propargyl ether of 4-vinylphenol)

A solution of 158 g. of poly(4-vinylphenol) in 1000 ml. acetone was reacted with 143 g. of propargyl bromide in the presence of 166 g. of potassium carbonate by heating under reflux for 72 hours. After filtering the reaction mixture, the solvent (acetone) in the filtrate was evaporated on a Buchi Re 121 Rotavapor. The yield was 95% of brown viscous semisolid.

The cross-linking of the propargyl groups of the poly (propargyl ether of 4-vinylphenol) was carried out in the presence of 1:1 complex of copper (I) chloride and N,N,N', N'-tetramethylethylenediamine. Three weight percent of copper (I) chloride based on polymer solid and equal molar amount of the diamine was added into a 10 weight percent solution of the poly(propargyl ether of 4-vinylphenol) in dimethylformamide (DMF)/pyridine (19:1) or MEK/pyridine (19:1). The polymer cross-links so rapidly that its solution gels within a few minutes. The precipitate polymer is insoluble in all common organic solvents.

EXAMPLE II

Preparation and Cross-Linking of Poly (propargyl methacrylate)

A solution of 86 g. (1 mole) of methacrylic acid in 120 ml. benzene was reacted with 67.2 g. (1.2 moles) of propargyl alcohol in the presence of 4 g. of p-toluenesulfonic acid as a catalyst and 0.4 g. p-tertbutylcatechol as an inhibitor. The reaction mixture was stirred and heated to reflux under nitrogen until 18 g. of water was azeotroped over into a Dean-Stark trap. The reaction mixture was neutralized with saturated sodium carbonate aqueous solution, washed with deionized water three times and dried over sodium carbonate. The solvent was removed on a Rotavapor. Vacuum distillation of the residue in the presence of the inhibitor gave a 75% yield of propargyl methacrylate obtained as a clear colorless liquid.

A solution of 20 g. of propargyl methacrylate in 80 ml. of acetone was heated in the presence of 1.4 g. of benzoyl peroxide under reflux for 3 hours. After cooling to room temperature, the polymer was precipitated in 1000 ml. of methanol, filtered, washed with methanol, and dried in vacuum at room temperature to constant weight. The yield was 20% of a white solid polymer soluble in common organic solvents.

Poly (propargyl acrylate) was prepared following the procedure described above for poly (propargyl methacrylate).

A DMF or methylethyl ketone (MEK) solution of poly (propargyl methacrylate) which contains 3% CuCl and equal molar amount on N,N,N',N'-tetramethylethylenediamine formed a cross-linked film within a few minutes when exposed to air. A coating, prepared from this formulation on a cold rolled steel panel and air-dried for 15 hours, resisted more than 100 MEK double rubs. In contrast, the MEK double rubs of a coating, prepared from the same polymer without copper (I) chloride, were less than 10.

EXAMPLE III

Preparation of Nonionic Copolymers

A nonionic copolymer based on propargyl methacrylate, methyl methacrylate and butyl acrylate with a monomer weight ratio of 10:65:25 (molar ratio of 8.6:70.3:21.1) was prepared as a thermosetting acrylic resin. A solution of 2 g. of propargyl methacrylate, 13 g. of methyl methacrylate and 5 g. of butyl acrylate was heated in acetone in the presence of 1 g. of AIBN under reflux for 14 hours.

A 25% solution of this copolymer in acetone formed a gel in the presence of 3 weight percent of copper (I) chloride and equal molar amount of N,N,N',N'-tetramethylethylenediamine in 10 minutes when exposed to air.

EXAMPLE IV

Preparation of Basic Copolymers

A solution of the thermosetting basic copolymer based on propargyl acrylate, methyl methacrylate, butyl acrylate and methacrylamide with a monomer weight ratio of 10:65:20:5 (molar ratio of 9.5:68.0:16.4:6.1) gelled with the copper drier (CuCl/diamine) in a few minutes. This copolymer cross-linked within 24 hours in the presence of only a trace amount (0.1 weight percent) of copper (I) chloride in the absence of any other co-catalyst (diamine, etc.).

EXAMPLE V

Preparation of Acidic Copolymers

An acidic copolymer based on propargyl methacrylate, methyl methacrylate, butyl acrylate and acrylic acid with a monomer weight ratio of 10:65:20:5 (molar ratio of 8.4:68.0:16.3:7.3) was prepared as a thermosetting acrylic resin. The copolymer was soluble in water when neutralized with a base such as triethylamine. The copolymer cured slower (for 10 hours) with a larger amount (5 weight percent based on the acidic copolymer) of copper (I) chloride and equal molar amount of the diamine (N,N,N',N'-tetramethylethylenediamine).

EXAMPLE VI

Preparation of Propargyl Copolymer 10 g. of butyl acrylate, 4 g. of methyl methacrylate, 6 g. of propargyl methacrylate, 80 ml of MEK, and 0.4 g. of AIBN (initiator) were added into a 250 ml one-neck flask. The resulting mixture was refluxed for 4 hours to form a polymer solution.

EXAMPLE VII

Coating Properties of Air Dried Propargyl Copolymer

A copper drier, that contains 0.0075 g Cu(I)Cl, 0.01 g of N,N,N',N'-tetramethylethylenediamine, 0.1 g. of pyridine, and 0.1 g. DMF, was added into a 1.25 g. of polymer solution that contains 0.25 g of polymer prepared according to Example VI (see above). The resulting mixture was mixed well and used for application of coatings on cold-rolled, steel panels. Once exposed to air, the polymer air-dried, cross-linked, and formed insoluble coatings within one minute. Coating properties were evaluated 72 hours after the coating application.

| Sward Hardness | ASTM D2134–66 | 28 |
| Pencil Hardness | ASTM D3363–74 | H |
| Adhesion | ASTM D3359–78 | 5B |
| Impact Strength Direct/Reverse | ASTM D2794–84 | 120/120 in-lb |
| Flexibility | ASTM D4145–83 | Pass |
| Solvent Resistance | ASTM D4752–87 | 40 MEK double rubs |

EXAMPLE VIII

Preparation of Latex Copolymer 35 ml of deionized water, 0.15 g. of NaHCO$_3$, 0.4 g. of QS-44 surfactant and 0.8 g. of X-301 surfactant are introduced into a 100 ml flask and mixed well. To this mixture, 10 g. of butyl acrylate, 8 g. of methyl methacrylate, 2 g. of propargyl methacrylate, and 1.0 g. of ammonium persulfate are added and mixed well again.

10 ml of the above mixture were added into a 100 ml three-neck flask supplied with a mechanical stir, thermometer, and condenser and heated to 85° C. by a water bath. The remainder of the emulsion was added dropwise at 85° C. from the an addition funnel for an hour. After this addition was completed, the mixture was stirred at 85° C. for an additional 3 hours, and then, the resulting latex was cooled to room temperature.

EXAMPLE IX

Propargyl Copolymer Cross-Linked in Presence of Reactive Diluent 1. Preparation of dipropargyl ether of hexafluorobisphenol A A solution of 168.12 g. (0.5 mole) of hexafluorobisphenol A in 1000 ml of acetone was reacted with 142.76 g. (1.2 moles) of propargyl bromide in the presence of 165.85 g. (1.2 moles) of potassium carbonate. The reaction mixture was stirred and heated under reflux for 72 hrs. After cooling it was filtered and the solvent (acetone) of the filtrate was evaporated on a Buchi Re 121 Rotavapor. The residue was dissolved in diethyl ether and washed first with a 5% NaOH solution and then three times with deionized water. Dipropargyl ether of hexafluorobisphenol A was obtained in 90% yield after evaporation of diethyl ether on a Rotavapor. The product was a light brown liquid with the following structure.

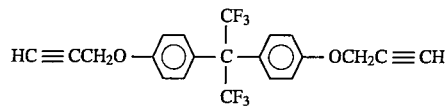

2. Preparation and Cross-Linking of Copolymer

The polymer solution was prepared as described in Example VI, but it contained 0.05 g. of dipropargyl ether of hexafluorobisphenol A as a reactive diluent. Coating properties were evaluated 72 hours after coating application.

| Sward Hardness | ASTM D2134–66 | 28 |
| Pencil Hardness | ASTM D3363–74 | H |
| Adhesion | ASTM D3359–78 | 5B |
| Impact Strength Direct/Reverse | ASTM D2794–84 | 120/120 in-lb |
| Flexibility | ASTM D4145–83 | Pass |
| Solvent Resistance | ASTM D4752–87 | 40 MEK dbl rubs |

Other propargyl aromatic ethers, as for instance, dipropargyl ether of resorcinol may be obtained in a similar manner.

EXAMPLE X

Preparation of Copper Catalyst and Activators

Copper drier catalyst is prepared from 0.33 g. (0.003 mole) copper chloride, 1 ml DMF, 1 ml pyridine, and 0.39 g. (0.003 mole) N,N,N',N'-tetramethylethylenediamine under nitrogen. Copper chloride is first dissolved in DMF and pyridine and then tetramethylethylenediamine is added. This solution may be added into the polymer with pendent acetylenic groups, and the resulting mixtures may be used for the preparation of air-drying coatings according to the invention.

The coating formulations were prepared from an aqueous or non-aqueous solutions by casting with a draw bar on cold-rolled steel panels. Coatings, however, can be applied by other suitable means: brush, spray, etc., on cold-rolled steel panels or on other substrates. Coatings air dry is completed for about one hour at room temperature and proceeds faster at higher temperature. Coating films were characterized by the corresponding ASTM test methods. Coating properties, obviously, vary and depend on polymer composition. See Examples VII and IX.

Particular features of the invention are emphasized in the claims which follow.

What is claimed is:

1. A polymeric vehicle comprising:

a polymer selected from the group consisting of a homopolymer and copolymer of alpha, beta unsaturated monomers, from about 5 to about 100 molar percent of the monomeric units forming the polymer having at least one pendent propargyl group, the polymer having a number average molecular weight in the range of from about 500 to about 100,000; and a copper (I) catalyst, the polymer being adapted to be cross-linked through reaction of the propargyl groups, the cross-linking reaction being catalyzed by the copper (I) catalyst to provide the coating binder, the polymer vehicle being effective for providing a coating binder having a hardness of at least about B and an impact resistance of at least about 50 inch-pounds after being applied to a substrate at a thickness of about 1 to about 3 mils wet and air dried for not more than about 24 hours at not less than about −10° C., and not more than about 30° C.

2. A polymeric vehicle as recited in claim 1 wherein from about 5 to about 20 molar percent of the monomeric units which form the polymer have at least one propargyl group.

3. A polymeric vehicle as recited in claim 2 wherein the polymer comprises repeating units having the general formula

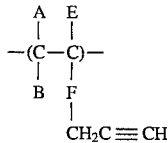

wherein

A is selected from the group consisting of —H and alkyl having 1 to 4 carbons,

B is selected from the group consisting of —H or alkyl having 1 to 4 carbons,

E is selected from the group consisting of —H and alkyl having 1 to 4 carbon atoms, and F is selected from the group consisting of —C(=O)O—, —O—,

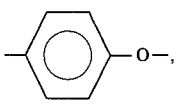

—C(=O)O(CH$_2$CH$_2$O—)$_n$, wherein n=1 to 5.

4. A polymeric vehicle as recited in claim 3 wherein A is —H, B is —H, and E is —H or methyl.

5. A polymeric vehicle as recited in claim 1 wherein the polymeric vehicle further includes a reactive diluent which is a compound having two or more acetylenic groups reactive with pendent acetylenic groups on the polymer, the reactive diluent being miscible with the polymer and having a viscosity not greater than about 500 cP at from about 10° to about 50° C.

6. A polymeric vehicle as recited in claim 1 wherein at least 0.1 molar percent of the monomeric units which form the polymer have an activator group selected from the group consisting of amino and amido.

7. A polymeric vehicle which provides a coating binder having a hardness of at least about B and an impact resistance of at least about 50 inch-pounds after being applied to a substrate at a thickness of about 1 to about 3 mils wet and air dried for not more than about 24 hours at not less than about −10° C., the polymeric vehicle comprising:

a polymer selected from the group consisting of a homopolymer and copolymer of alpha, beta unsaturated monomers, from about 1 to about 100 molar percent of the monomeric units forming the polymer having at least one acetylenic group, the polymer having a number average molecular weight in the range of from about 500 to about 100,000; and at least about 0.1 weight percent copper (I) catalyst, the polymer being cross-linked through reaction of the acetylenic groups, the cross-linking reaction being catalyzed by the copper (I) catalyst to provide a cross-linked polymer, the polymer comprising repeating units having the general formula

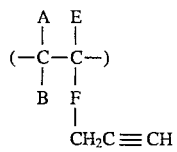

wherein

A is selected from the group consisting of —H and alkyl having 1 to 4 carbons,

B is selected from the group consisting of —H and alkyl having 1 to 4 carbons,

E is selected from the group consisting of —H and alkyl having 1 to 4 carbons, and F is selected from the group consisting of —C(=O)O—, —O—,

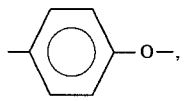

—C(=O)O(CH$_2$CH$_2$O—)$_n$, wherein n=1 to 5, wherein from about 5 to about 20 molar percent of the monomeric units which form the polymer have at least one propargyl group.

8. A polymeric vehicle as recited in claim 7 wherein A is —H, B is —H, and E is —H or methyl.

9. A polymeric vehicle as recited in claim 7 wherein the polymeric vehicle further includes a reactive diluent which is a compound having two or more acetylenic groups reactive with pendent acetylenic groups on the polymer, the reactive diluent being miscible with the polymer and having a viscosity not greater than about 500 cP at from about 10° to about 50° C.

10. A polymeric vehicle as recited in claim 7 wherein the monomeric units which form the polymer have at least 0.1 molar percent of an activator group selected from the group consisting of amino and amido.

11. A polymeric vehicle as recited in claim 7 wherein the catalyst comprises from about 0.1 to about 3 weight percent of the polymeric vehicle.

12. A polymeric vehicle as recited in claim 11 wherein the polymer vehicle further includes an activator compound which has an amino or amido group.

13. A composition as recited in claim 11 wherein the polymer is a copolymer comprising a propargyl monomer substituted with a propargyl group which provides a pendent propargyl group in the polymer, the propargyl monomer being selected from the group consisting of propargyl acrylate, propargyl methacrylate, propargyl ether of 4-vinyl phenol, vinyl propargyl ether, and vinyl propiolate, and a second monomer, the second monomer selected from the group consisting of acrylic acid, methacrylic acid, methyl methacrylate, butylacrylate, acrylonitrile, acrylamide, styrene, 1,3-butadiene, 1-hexene, p-tert. butylstyrene, chloroprene, chlorostyrene, isobutylene, 2,3-dimethylbutadiene, ethyl acrylate, methacrylonitrile, alphamethylstyrene, 4-methylpantene-1, vinyl isobutyl ether, N,N'-dimethylacrylamide, N,N'-dimethylmethacrylamide, and 4-vinylpyridine.

14. A coating binder having a hardness of at least about B and an impact resistance of least about 50 inch-pounds, the coating binder comprising:

a polymer cross-linker in the presence of a catalyst, the polymer comprising repeating units having the general formula $$(-\overset{\overset{\displaystyle A}{|}}{\underset{\underset{\displaystyle B}{|}}{C}}-\overset{\overset{\displaystyle E}{|}}{\underset{\underset{\displaystyle F}{|}}{C}}-)$$
$$CH_2C\equiv CH$$

wherein

A is selected from the group consisting of —H and alkyl having 1 to 4 carbons,

B is selected from the group consisting of —H and alkyl having 1 to 4 carbons,

E is selected from the ground consisting of —H and alkyl having 1 to 4 carbons, and F is selected from the group consisting of —C(=O)O—, —O—,

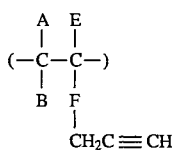

—C(=O)O(CH$_2$CH$_2$O—)$_n$, wherein n=1 to 5, from about 5 to about 20 molar percent of the monomeric units which form the polymer have at least one propargyl group, and the monomeric units which form the polymer have at least 0.1 molar percent of an activator group selected from the group consisting of amino and amido, the polymer selected from the group consisting of a homopolymer and copolymer of alpha, beta unsaturated monomers, from about 1 to about 100 molar percent of the monomeric units which form the polymer having acetylenic groups, the polymer having a number average molecular weight in the range of from about 500 to about 100,000, the polymer being cross-linked through the reaction of the acetylenic groups to provide the coating binder.

15. A coating binder as recited in claim 14 wherein the catalyst is a copper (I) catalyst.

16. A method for providing a coating binder, the method comprising:

exposing a polymeric vehicle to air, the polymeric vehicle comprising a polymer selected from the group consisting of a homopolymer and copolymer of alpha, beta unsaturated monomers, the polymer comprising repeating units having the general formula $$(-\overset{\overset{\displaystyle A}{|}}{\underset{\underset{\displaystyle B}{|}}{C}}-\overset{\overset{\displaystyle E}{|}}{\underset{\underset{\displaystyle F}{|}}{C}}-)$$
$$CH_2C\equiv CH$$

wherein

A is selected from the group consisting of —H and alkyl having 1 to 4 carbons,

B is selected from the group consisting of —H and alkyl having 1 to 4 carbons,

E is selected from the ground consisting of —H and alkyl having 1 to 4 carbons, and F is selected from the group consisting of —C(=O)O—, —O—,

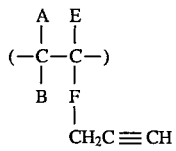

—C(=O)O(CH$_2$CH$_2$O—)$_n$, wherein n=1 to 5, from about 5 to about 20 molar percent of the monomeric units which form the polymer have at least one propargyl group, and the monomeric units which form the polymer have at least 0.1 molar percent of an activator group selected from the group consisting of amino and amido, from about 1 to about 100 molar percent of the monomeric units forming the polymer having at least one acetylenic group, the polymer having a number average molecular weight in the range of from about 500 to about 100,000, the polymer being cross-linked through reaction of the acetylenic groups, the cross-linking reaction being catalyzed by a copper (I) catalyst to provide the coating binder.

17. A method as recited in claim 16 wherein the polymeric vehicle is exposed to air in a temperature range of from about 30° C., to about −10° C.

18. A composition comprising:

a polymer selected from the group consisting of a homopolymer and copolymer of alpha, beta unsaturated monomers, from about 1 to about 100 molar percent of the monomeric units forming the polymer having at least one acetylenic group, the polymer having a number average molecular weight in the range of from about 500 to about 100,000;

the polymer comprising repeating units having the general formula

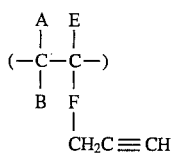

wherein

A is selected from the group consisting of —H and alkyl having 1 to 4 carbons,

B is selected from the group consisting of —H and alkyl having 1 to 4 carbons,

E is selected from the group consisting of —H and alkyl having 1 to 4 carbons, and F is selected from the group consisting of —C(=O)O—, —O—,

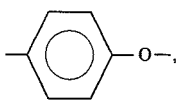

—C(=O)O(CH$_2$CH$_2$O—)$_n$, wherein n=1 to 5, wherein from about 5 to about 20 molar percent of the monomeric units which form the polymer have at least one propargyl group, wherein the monomeric units which form the polymer have at least 0.1 molar percent of an activator group selected from the group consisting of amino and amido, wherein the composition provides a coating binder having a hardness of at least about B and an impact resistance of at least about 50 inch-pounds after being applied to a substrate at a thickness of about 1 to about 3 mils wet and air dried for not more than about 24 hours at not less than about −10° C., when cross-linked with an amount of catalyst effective for cross-linking.

19. A polymeric vehicle comprising:

a polymer selected from the group consisting of a homopolymer and copolymer of alpha, beta unsaturated monomers, from about 1 to about 100 molar percent of the monomeric units forming the polymer having at least one pendent acetylenic group, at least about 0.1 molar percent of the monomeric units forming the polymer having amino or amido groups, the polymer having a number average molecular weight in the range of from about 500 to about 100,000; and a copper (I) catalyst, the polymer being adapted to be cross-linked through reaction of the acetylenic groups, the cross-linking reaction being catalyzed by the copper (I) catalyst to provide a coating binder having a hardness of at least about B and an impact resistance of at least about 50 inch-pounds after being applied to a substrate at a thickness of about 1 to about 3 mils wet and air dried for not more than about 24 hours at not less than about −10° C. but not more than about 30° C. for 60 minutes.

20. A polymeric vehicle as recited in claim 19 wherein from about 5 to about 20 molar percent of the monomeric units which form the polymer have at least one acetylenic group.

21. A polymeric vehicle as recited in claim 20 wherein the polymeric vehicle further includes a reactive diluent which is a compound having two or more acetylenic groups reactive with pendent acetylchic groups on the polymer, the reactive diluent being miscible with the polymer and having a viscosity not greater than about 500 cP at from about 10° to about 50° C.

* * * * *

UNITED STATES PATENT AND TRADEMARK OFFICE
CERTIFICATE OF CORRECTION

PATENT NO. : 5,556,921
DATED : September 17, 1996
INVENTOR(S) : Dirlikov et al.

It is certified that error appears in the above-indentified patent and that said Letters Patent is hereby corrected as shown below:

Claim 12, column 15, line 7, change "polymer" to --polymeric--.

Claim 13, column 15, line 20, change "alphamethylstyrene" to --alpha-methylstyrene--).

Claim 14, column 15, line 42, change "E is selected from the ground" to --E is selected from the group--.

Claim 16, column 16, line 25, change "E is selected from the ground" to --E is selected from the group--.

Claim 21, column 18, line 30, Change acetylchic" to --acetylenic--.

Signed and Sealed this

Fourteenth Day of January, 1997

Attest:

BRUCE LEHMAN

Attesting Officer     Commissioner of Patents and Trademarks